United States Patent [19]

Pischinger et al.

[11] Patent Number: 5,671,600
[45] Date of Patent: Sep. 30, 1997

[54] METHOD OF REDUCING THE $NO_x$ EMISSION OF A SUPERCHARGED PISTON-TYPE INTERNAL COMBUSTION ENGINE

[75] Inventors: Franz Pischinger, Aachen; Manfred Dürnholz, Heinsberg; Gerhard Lepperhoff, Stolberg; Georg Hüthwohl, Aachen, all of Germany

[73] Assignee: FEV Motorentechnik GmbH & Co. KG, Aachen, Germany

[21] Appl. No.: 555,788

[22] Filed: Nov. 9, 1995

[30] Foreign Application Priority Data

Nov. 9, 1994 [DE] Germany ............ 44 39 940.5

[51] Int. Cl.⁶ .................... F02B 37/00; F02M 25/06
[52] U.S. Cl. ........................ 60/605.2; 123/569
[58] Field of Search .................. 60/605.2, 278; 123/568, 569, 570

[56] References Cited

U.S. PATENT DOCUMENTS 4,087,966  5/1978  Akado et al. .................. 60/278
4,350,013  9/1982  Yoshiba ........................ 60/605.2
4,426,848  1/1984  Stachowicz .................... 60/605.2

FOREIGN PATENT DOCUMENTS 3-37318  2/1991  Japan ......................... 60/605.2

*Primary Examiner*—Michael Koczo
*Attorney, Agent, or Firm*—Spencer & Frank

[57] ABSTRACT

A method of reducing $NO_x$ emissions of a turbo-charged internal combustion engine. The engine has an exhaust conduit guiding an exhaust gas stream, a charge-air intake conduit guiding a charge-air stream and a turbocharger including a turbine disposed in the exhaust conduit and a compressor disposed in the charge-air intake conduit. The method comprises the steps of branching off a partial exhaust gas quantity from the exhaust gas stream upstream of the turbine as viewed in a direction of exhaust gas flow; passing the partial exhaust gas quantity through a particle filter; and introducing the partial exhaust gas quantity into the charge-air stream upstream of the compressor.

4 Claims, 1 Drawing Sheet

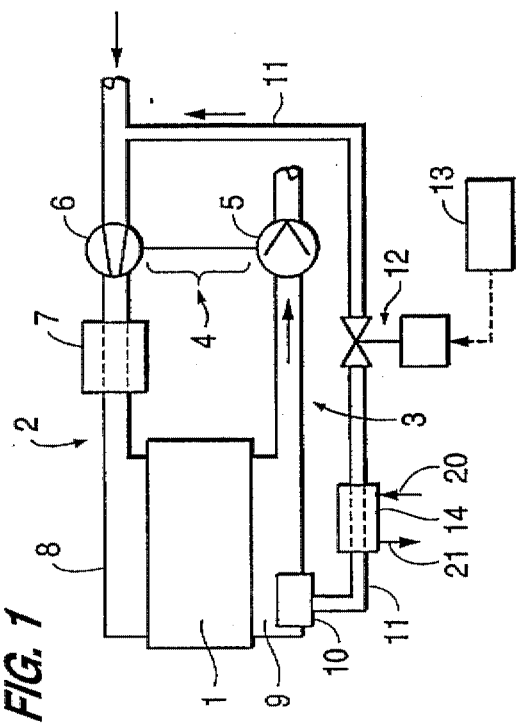
FIG. 1
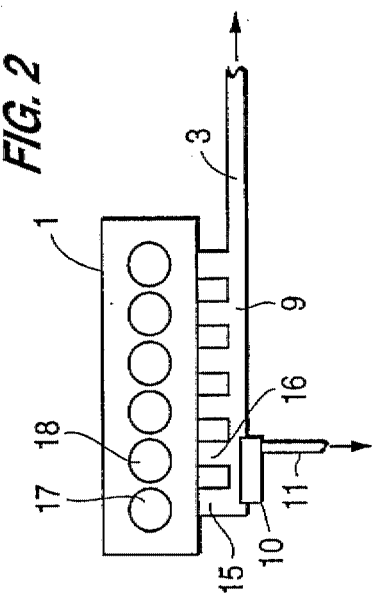
FIG. 2
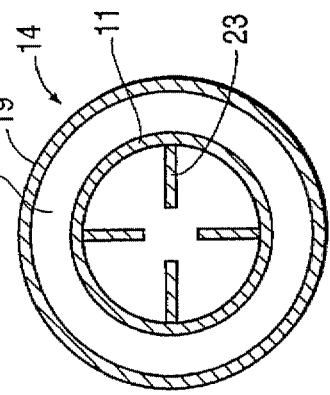
FIG. 4
FIG. 3

METHOD OF REDUCING THE $NO_x$ EMISSION OF A SUPERCHARGED PISTON-TYPE INTERNAL COMBUSTION ENGINE

CROSS REFERENCE TO RELATED APPLICATION

This application claims the priority of German Application No. P 44 39 940.5 filed Nov. 9, 1994, which is incorporated herein by reference.

BACKGROUND OF THE INVENTION

This invention relates to a method of reducing the $NO_x$ emission of a piston-type internal combustion engine, particularly a diesel engine, which is supercharged by a turbocharger. The reduction is effected by reintroducing a part of the exhaust gas into the charge air.

The $NO_x$ emission may be reduced by exhaust gas reintroduction. Personal automotive vehicles are preponderantly driven in the partial load operating range. In such engines, the exhaust gas return systems are used serially to reduce the $NO_x$ emission at partial engine load which is the essential operational range. The exhaust gas is branched off upstream of the turbine of the turbocharger and is reintroduced at the pressure side of the compressor; this proceeding is referred to as hot exhaust gas reintroduction. In personal automotive vehicles, such a method yields a positive pressure drop for driving the partial exhaust gas stream to be reintroduced.

In contrast to personal automotive vehicles, utility vehicles are preponderantly used in the full load operating range. The known concepts used in personal automotive vehicles may not be resorted to in engines for utility vehicles because in the full load range no positive pressure drop is available to advance the partial exhaust gas stream for reintroduction. It is a further disadvantage in diesel engines that soot emission increases in case of a hot exhaust gas reintroduction during operation close to full load conditions.

For environmental protection the emission limits of pollutants such as particles, $NO_x$, HC and CO have been rendered more stringent. Particularly the $NO_x$ limit values may be observed in diesel engines only with a substantial technological outlay in the diesel fuel injection system. In such methods, however, an increase in the fuel consumption must be taken into account which, in turn, leads to an increase of at least the $CO_2$ emission.

SUMMARY OF THE INVENTION

It is an object of the invention to provide an improved method of the above-outlined type which, in piston-type internal combustion engines, particularly diesel engines charged by a turbocharger, reduces at least the $NO_x$ emission by a partial exhaust gas reintroduction under full load conditions without an increase of the fuel consumption or an increase of other emissions.

This object and others to become apparent as the specification progresses, are accomplished by the invention, according to which, briefly stated, the partial exhaust gas stream to be reintroduced is branched off from the exhaust gas stream upstream of the turbine of the supercharger, the branched partial exhaust gas stream is passed through a particle filter and is reintroduced into the charge air upstream of the compressor.

By virtue of the reintroduction of a relatively small quantity of exhaust gas, particularly in the full load range, a decrease of the $NO_x$ emission by approximately 20–30% is possible without increasing fuel consumption or particle emission. In this manner the environmentally harmful $NO_x$ emission of utility vehicles may be reduced. It is a further advantage of the method according to the invention that the vehicles may be retrofitted so that a reduction of noxious emissions by utility vehicles is not limited to new machines but practically all utility vehicles which have supercharged piston-type internal combustion engines may practice the method according to the invention.

The method according to the invention ensures that a sufficient pressure drop is available for the partial exhaust gas quantities to be reintroduced by providing that such a partial exhaust gas quantity is removed at the high pressure side of the exhaust gas system upstream of the turbine and is reintroduced into the air intake conduit upstream of the compressor. In the full load range which is of particular interest here, the pressure drop amounts to more than 100 kPa.

By passing the partial exhaust gas quantity removed from the exhaust gas stream through a particle filter and thus purifying it, a soiling of the compressor, particularly a soiling of the charge-air cooler connected after the compressor is avoided. Without such purification the charge-air cooler would be obstructed in a short period of time, leading to a drop in the degree of efficiency of the internal combustion engine during the operational period and to an increase in the fuel consumption as well as the $NO_x$ emission. For purifying the partial exhaust gas quantity to be reintroduced, a conventional diesel particle filter may be used which may be coupled with an oxidizing catalyst. Expediently, the branched-off partial exhaust gas quantity is cooled, particularly if the charge-air cooler is insufficiently dimensioned which may be the case in retrofitted engines. The particle filter collects the particles which would contribute to the coking of the cooler, the compressor and also the charge-air cooler. The particle filter may be continuously or intermittently cleaned by conventionally burning off the soot.

According to a particularly advantageous feature of the method according to the invention, the partial exhaust gas quantity is branched off and reintroduced into the charge air only after approximately full load operating conditions are reached. Such a procedure takes into account the circumstance that particularly the noxious $NO_x$ emissions in diesel engines are present to an appreciable extent only when an engine operation is reached that is close to full load conditions.

According to a further advantageous feature of the invention, the partial exhaust gas quantity to be reintroduced is taken from the exhaust conduit in the exhaust region of at least one predetermined cylinder and the particle filtering is performed in the branch-off zone. Such a method, based on the large pressure drop, allows the particle filter to have very small dimensions and thus a small heat capacity. Since the branching of the partial exhaust gas quantity occurs in the hottest zone of the exhaust gas, the particle filter heats up very rapidly as the gas flows therethrough so that the regeneration takes only a few seconds rather than several minutes as it has been characteristic in conventional systems. Conditioned upon an appropriate filter design and control of the exhaust gas reintroduction, this arrangement makes it possible to perform an automatic cleaning of the filter in the exhaust return conduit even if the engine, for example, a city bus engine, is driven in the full load range only for short periods. Since in the partial load range preferably no exhaust gas reintroduction takes place, no particles in the filter may accumulate at temperatures which are too low for burning off soot. Since upon activation of the exhaust gas reintroduction, hot exhaust gases flow through the filter and thus within a short period the soot-igniting temperature of approximately 600° C. is reached, soot burn-off occurs within a few minutes. This means that the secondary energy supplying systems conventionally required in diesel engines, such as a burner driven by the diesel fuel or the like may be dispensed with. Since the particle filter may be of small dimensions, the delay between the turn-on of the exhaust gas reintroduction and reaching a temperature sufficient for burning off soot is acceptable because of the low heat capacity of the filter.

According to another advantageous feature of the invention, the particle filter is heated by means of at least one part of the exhaust gas stream. Such a method is advantageous in that the particle filter may be maintained at the exhaust gas temperature even if the exhaust gas return is inactive, that is, the exhaust gas does not pass through the particle filter. As a result, for example, in a city bus engine, a basic filter temperature of approximately 200°–300° C. may be maintained so that, after activating the gas return system, a temperature jump from the filter temperature to the soot-igniting temperature is reduced.

According to a further advantageous feature of the invention, for increasing the filtering temperature, the particle filter is located in the exhaust gas outlet region of a predetermined cylinder and further, in the partial load operation, such a cylinder is, by means of appropriate engine control, driven with a higher engine load than the other cylinders. Because of the unequally distributed engine load, in the low range of the partial load operation the exhaust temperature of such a cylinder or, if required, of any additional cylinder is increased. As a result, even then a sufficiently high base temperature may be maintained and thus, each time the engine operates close to the full load conditions with exhaust gas return, an automatic soot burn-off is effected. Further, by virtue of the unequal load distribution, that operational zone of the engine is expanded where regeneration of the particle filter occurs when the exhaust gas reintroduction is activated.

Any temperature-stable filter material such as cordierite, glass ceramic, SiC or appropriate porous metals are adapted for use as particle filters. The filter material may be catalytically coated in a conventional manner so that high-boiling point hydrocarbons additionally present in the reintroduced exhaust gas quantity may be oxidized which otherwise could soil the exhaust gas return conduit, the fresh air intake conduit and particularly the charge-air cooler. Instead of such a catalytic coating of the filter material itself, a separate oxidizing catalyst may be connected to the particle filter upstream or downstream thereof.

For performing the inventive method, there is provided, according to the invention, a piston-type internal combustion engine, particularly a diesel engine which has an exhaust gas turbocharger and a device for reintroducing a partial exhaust gas quantity into the charge air, wherein an exhaust gas return conduit is provided which communicates with the exhaust conduit in the region upstream of the turbine and with the charge-air intake conduit at the intake side of the compressor and further wherein a particle filter and an exhaust gas cooler are arranged in the exhaust gas return conduit.

According to a particularly advantageous feature of the invention, the exhaust gas cooler is connected with the cooling system of the internal combustion engine.

According to another advantageous feature of the invention, the particle filter in the exhaust gas return conduit is directly connected with the exhaust conduit in the region of the engine. By virtue of the fact that the particle filter is connected with the hottest part of the exhaust gas return conduit, it is ensured that the housing of the particle filter is maintained at an elevated base filter temperature by means of heat conduction. It is of particular advantage in this connection to provide, according to another feature of the invention, that the housing of the particle filter is, at least partially, situated in that part of the exhaust conduit through which the hot exhaust gases pass.

BRIEF DESCRIPTION OF THE DRAWING

FIG. 1 is a block diagram illustrating the method according to the invention.

FIG. 2 is a schematic top plan view of an internal combustion engine illustrating the positioning of a particle filter according to the invention.

FIG. 3 is a schematic top plan view of an internal combustion engine illustrating another arrangement for the particle filter according to the invention.

FIG. 4 is a schematic cross-sectional view of a cooler construction in the exhaust gas return conduit according to the invention.

DESCRIPTION OF THE PREFERRED EMBODIMENTS

Turning to FIG. 1, the multi-cylinder diesel engine 1 shown therein has a charge-air conduit 2 and an exhaust conduit 3. For charging the engine cylinders, an exhaust gas turbocharger 4 is provided, whose turbine 5 is situated in the exhaust conduit 3, whereas its compressor 6 is situated in the intake conduit 2. A charge-air cooler 7 is connected to the pressure side of the compressor 6 in the intake conduit 2 so that the cooled and compressed air may be advanced to the diesel engine 1 through the intake manifold 8.

In the exhaust manifold 9 of the exhaust conduit 3, that is, immediately at the diesel engine 1, a particle filter 10 is located whose inlet opens into the exhaust manifold 9, while its outlet communicates with an exhaust gas return conduit 11 which opens into the intake (suction) side of the compressor 6 in the charge-air conduit 2. In the exhaust gas return conduit 11 a valve 12 is situated which may be actuated by a control device 13 so that in the course of the usual engine control, the valve 12 may be operated in such a manner that every time a predetermined load threshold is exceeded in an operational zone close to the full load up to the full load region, the valve 12 opens and a corresponding partial exhaust gas quantity is reintroduced into the charge-air conduit 2. Since the partial exhaust gas quantity is guided through the particle filter 10, harmful particles are filtered so that neither the valve 12 nor the after-connected compressor 6 and the charge-air cooler 7 will be soiled.

To ensure that the desired degree of compression of the charge air is reached for a given compressor size which is particularly of significance in retrofitted engines, it may be expedient to guide the returned partial exhaust gas quantity through an exhaust gas cooler 14 which is situated in the exhaust gas return conduit 11 and which is expediently coupled to the engine cooling system so that the partial exhaust gas quantity enters the compressor with a reduced temperature.

If, as illustrated in FIG. 3, the particle filter 10 is secured directly to the exhaust manifold 9, then even in partial load conditions, when no exhaust gas flows through the particle filter 10, a relatively high basic temperature for the particle filter 10 is maintained.

As an alternative, however, the arrangement may be that of FIG. 1, according to which the housing of the particle filter 10 is at least in part situated inside the exhaust manifold 9 and is thus directly exposed to the hot exhaust gas so that upon opening of the valve 12 in the operational zone close to the full load conditions, the hot partial exhaust gas quantity, as it passes through the particle filter, heats the latter to such an extent that soot burn-off occurs automatically.

As illustrated in FIG. 2, the particle filter 10 may be arranged in the exhaust manifold 9 in such a manner that it is associated with the exhaust gas outlets 15 and/or 16 belonging to the respective cylinders 17 and/or 18. If the engine control is so designed that the associated cylinders 17 and 18 operate in the partial load conditions with a higher output than the other cylinders, then in the gas outlets 15 and 16 the exhaust gas quantity of these two cylinders exits with a higher temperature than those for the other cylinders so that the particle filter 10 positioned in the region of the two exhaust gas outlets 15 and 16 is exposed to the correspondingly hotter exhaust gases even under partial load conditions. Consequently, the particle filter 10 is heated to a higher base filter temperature without the particle filter 10 itself being exposed to a partial exhaust gas quantity in the partial load range.

Such a mode of operation is also feasible with an arrangement of the particle filter 10 in accordance with FIG. 3 because there too, by means of the increased temperature exposure from the exhaust manifold 9 in this zone, a correspondingly higher basic filter temperature may be achieved by heat transfer through heat conduction. In the external positioning of the particle filter 10 shown in FIG. 3, a simpler construction and thus a simpler replacement possibility is provided. Therefore, this arrangement is advantageous in vehicles where it may be assumed that the periods of full load condition are always in excess of 20 seconds. The temperature exposure in case of the operating (activated) particle filter 10 is then sufficient to ensure a filter regeneration. Such full load periods are practically always present in long-distance trucks.

FIG. 4 shows in cross section an embodiment of an exhaust gas cooler 14 arranged in the exhaust gas return conduit 11. The exhaust gas return conduit 11 is, along a length portion, surrounded by a tubular sleeve 19 which is closed at its opposite ends and is provided, respectively, with an inlet 20 and an outlet 21 so that a coolant, for example, the coolant of the engine cooling system, may pass through the intermediate space 22 defined between the sleeve 19 and the exhaust gas return conduit 11. The flow direction of the coolant in the intermediate space 22 is expediently opposite to the direction of flow of the partial exhaust gas in the exhaust gas return conduit 11. The exhaust gas return conduit 11 may be provided with radially inwardly directed ribs or vanes 23 in the zone of the sleeve 19 thereby enhancing the heat transfer from the exhaust gas to the coolant. By virtue of the cooling ribs 23 "dead water regions" are avoided, so that the formation of deposits is reliably prevented.

It will be understood that the above description of the present invention is susceptible to various modifications, changes and adaptations, and the same are intended to be comprehended within the meaning and range of equivalents of the appended claims.

What is claimed is:

1. A method of reducing $NO_x$ emissions of a turbocharged internal combustion engine having an exhaust conduit guiding an exhaust gas stream, a charge-air intake conduit guiding a charge-air stream and a turbocharger including a turbine disposed in the exhaust conduit and a compressor disposed in the charge-air intake conduit; comprising the following steps:

(a) after an engine operation close to full load conditions is reached, branching off, by a controlled operation of a valve, a partial exhaust gas quantity from the exhaust gas stream upstream of the turbine as viewed in a direction of exhaust gas flow;

(b) passing the partial exhaust gas quantity through a particle filter;

(c) introducing the partial exhaust gas quantity into the charge-air stream upstream of the compressor; and (d) heating the particle filter by at least one part of the exhaust gas stream.

2. The method as defined in claim 1, further comprising the step of cooling the partial exhaust gas quantity prior to step (c).

3. A method of reducing $NO_x$ emissions of a turbocharged internal combustion engine having an exhaust conduit guiding an exhaust gas stream, a charge-air intake conduit guiding a charge-air stream and a turbocharger including a turbine disposed in the exhaust conduit and a compressor disposed in the charge-air intake conduit; comprising the steps of (a) branching off, by a controlled operation of a valve, a partial exhaust gas quantity from the exhaust gas stream of at least one predetermined engine cylinder upstream of the turbine as viewed in a direction of exhaust gas flow;

(b) passing the partial exhaust gas quantity through a particle filter in a zone where step (a) is performed;

(c) introducing the partial exhaust gas quantity into the charge-air stream upstream of the compressor; and (d) heating the particle filter by at least one part of the exhaust gas stream.

4. The method as defined in claim 3, further comprising the step of operating said at least one predetermined engine cylinder in a partial load condition at a higher engine load than the other engine cylinders.

* * * * *